(12) United States Patent
Quast et al.

(10) Patent No.: US 10,611,272 B2
(45) Date of Patent: Apr. 7, 2020

(54) BEARING CAGE AND SEAT RAIL PAIR FOR A VEHICLE SEAT

(71) Applicant: Adient Luxembourg S.à.r.l., Luxembourg (LU)

(72) Inventors: Ingo Quast, Duesseldorf (DE); Erik Sprenger, Wermelskirchen (DE)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 43 days.

(21) Appl. No.: 16/063,836

(22) PCT Filed: Dec. 13, 2016

(86) PCT No.: PCT/EP2016/080819
§ 371 (c)(1),
(2) Date: Jun. 19, 2018

(87) PCT Pub. No.: WO2017/108504
PCT Pub. Date: Jun. 29, 2017

(65) Prior Publication Data
US 2019/0001842 A1  Jan. 3, 2019

(30) Foreign Application Priority Data
Dec. 21, 2015  (DE) .................. 10 2015 226 266

(51) Int. Cl.
*B60N 2/00* (2006.01)
*B60N 2/07* (2006.01)
(Continued)

(52) U.S. Cl.
CPC ......... *B60N 2/0705* (2013.01); *B60N 2/0715* (2013.01); *B60N 2/0722* (2013.01); *F16C 29/063* (2013.01); *F16C 33/48* (2013.01)

(58) Field of Classification Search
CPC ........ B60N 2/0722; B60N 2/067; B60N 2/07; B60N 2/075; B60N 2/0715; B60N 2/0705
(Continued)

(56) References Cited

U.S. PATENT DOCUMENTS

2005/0056761 A1  3/2005  Danjo et al.
2009/0102261 A1  4/2009  Bernhardt et al.
(Continued)

FOREIGN PATENT DOCUMENTS

DE   10 2011 081 107 A1   2/2013
EP      2 202 115 A1       6/2010
IE   10 2011 115948 B3    1/2013

*Primary Examiner* — Steven M Marsh
(74) *Attorney, Agent, or Firm* — Marshall Melhorn, LLC

(57) ABSTRACT

A bearing cage (6), for a seat rail pair (2) of a vehicle seat (1), has two interconnected cage elements (6.1, 6.2) which are axially symmetrical and accommodate a number of rolling bodies (5). A connecting element (6.3) is arranged between the cage elements (6.1, 6.2) at longitudinal sides of said cage elements, which face toward one another. The connecting element runs parallel to an axis of symmetry (S) and is of mechanically flexible. The connecting element (6.3) is in the form of a spring. The cage elements (6.1, 6.2) form spring limbs which are pivotable about the axis of symmetry (S). A seat rail pair (2) for a vehicle seat (1), in particular a motor vehicle seat, is also provided and includes at least one such bearing cage (6). A vehicle seat (1) is also provided that includes at least one such seat rail pair (2).

18 Claims, 7 Drawing Sheets

(51) Int. Cl.
*F16C 29/06* (2006.01)
*F16C 33/48* (2006.01)

(58) Field of Classification Search
USPC .................................. 248/424, 429, 430
See application file for complete search history.

(56) References Cited

U.S. PATENT DOCUMENTS

| | | | |
|---|---|---|---|
| 2010/0320353 A1 | 12/2010 | Kojima et al. | |
| 2011/0121154 A1* | 5/2011 | Kimura ............... | B60N 2/0705 248/429 |
| 2012/0006963 A1* | 1/2012 | Yoshida ............... | B60N 2/0705 248/429 |
| 2012/0032060 A1* | 2/2012 | Suzuki .................... | B60N 2/06 248/430 |
| 2012/0074288 A1* | 3/2012 | Yamada ............... | B60N 2/0705 248/430 |
| 2012/0074289 A1* | 3/2012 | Kimura ............... | B60N 2/0705 248/430 |
| 2012/0199719 A1* | 8/2012 | Yamada ............... | B60N 2/0705 248/430 |
| 2013/0206952 A1* | 8/2013 | Yamada ............... | B60N 2/0722 248/429 |

* cited by examiner

BEARING CAGE AND SEAT RAIL PAIR FOR A VEHICLE SEAT

CROSS REFERENCE TO RELATED APPLICATIONS

This application is a U.S. National Phase Application of International Application PCT/EP2016/080819, filed Dec. 13, 2016, and claims the benefit of priority under 35 U.S.C. § 119 of German Application 10 2015 226 266.9, filed Dec. 21, 2015, the entire contents of which are incorporated herein by reference.

FIELD OF THE INVENTION

The invention relates to a bearing cage for a seat rail pair of a vehicle seat, in particular a motor vehicle seat.

The invention furthermore relates to a seat rail pair for a vehicle seat, in particular for a motor vehicle seat, comprising at least one such bearing cage.

The invention furthermore relates to a vehicle seat comprising at least one such seat rail pair.

BACKGROUND OF THE INVENTION

Seat rail pairs for the longitudinal adjustment of a vehicle seat are generally known and comprise a lower rail and an upper rail which are arranged so as to be displaceable longitudinally relative to each other. For this purpose, rolling elements, such as, for example, rollers, are provided between the lower rail and the upper rail. The rolling elements are arranged in a bearing cage. In addition, a lock is provided which, in the blocked or locked state, engages in a blocking manner in at least one side wall of the lower rail and upper rail.

Such seat rail pairs are known from DE 10 2011 081 107 A1, US 2010/0320353 A1, US 2005/0056761 A1 and US 2009/0102261 A1.

SUMMARY OF THE INVENTION

It is an object of the present invention to specify a bearing cage, which is improved in relation to the prior art, for a seat rail pair of a vehicle seat, an improved seat rail pair and an improved vehicle seat.

The bearing cage according to the invention for a seat rail pair of a vehicle seat comprises two interconnected cage elements of axially symmetrical configuration, for receiving a number of rolling elements, and a connecting element which is arranged between the cage elements on facing longitudinal sides thereof, runs parallel to the axis of symmetry and is of mechanically flexible configuration wherein the connecting element is in the form of a spring, and the cage elements form spring legs which are pivotable about the axis of symmetry.

In an untensioned state of the connecting element, the cage elements are arranged here in particular in such a manner that the connecting element is tensioned in the mounted state of the bearing cage in the seat rail pair.

By this means, fixing of the bearing cage within one of the rails of the seat rail pair can already be achieved before the other rail is installed. Furthermore, because of the spring action and therefore possible pretensioning during the installation, the bearing cage in the mounted state is reliably fixed in its fitted position.

In one possible refinement, the connecting element is configured in the untensioned state in such a manner that an angle of more than 180° is formed between front sides of flat sides, running parallel to the axis of symmetry, of the connecting element, and an angle of less than 180° is formed on rear sides opposite the front sides. By this means, in the untensioned state of the connecting element, the cage elements are arranged facing one another in the region of the rear sides.

In a further possible refinement of the bearing cage, protrusions are in each case formed on one side on flat sides of the connecting element, said flat sides running parallel to the axis of symmetry. The effect achieved by means of the protrusions is that, in the mounted state of the bearing cage, by means of a portion, lying at least against the protrusions, of one of the rails of the seat rail pair, a force is exerted on the connecting element in such a manner that two mutually directed, resulting forces are produced on the cage elements. The forces result from a deformed state in the region of the connecting element of the bearing cage after the latter is installed on the seat rail pair, wherein the region deformed by the installation endeavors to return, i.e. to be deformed back, like a spring into a ready-from-the-mold or relaxed state. In the mounted state of the bearing cage, end portions of the two cage elements are arranged substantially perpendicularly to the flat sides of the connecting element and lie opposite one another. The resulting forces act here in substantially opposite directions from the respective cage element to the opposite cage element. This ensures in an advantageous manner that there is a gap or clearance between at least the rail, which is displaceable relative to the bearing cage, of the seat rail pair and the bearing cage. It is therefore made possible for the rail, which is displaceable relative to the bearing cage, to have material recesses and/or depressions, which are provided, for example, for the engagement of a locking device in the rail, and for contact and therefore engagement and interlocking of the cage elements in the material recesses and/or depressions to be avoided.

For example, the connecting element is in the form of what is referred to as a film joint or film hinge, as a result of which a number of mechanical parts of the bearing cage is reduced.

In one possible refinement of the bearing cage, the protrusions are each in the form of a spherical segment. This configuration in the form of a spherical segment ensures contact with the abutting portion of the rail irrespective of a shaping of said portion.

In a further possible refinement of the bearing cage, the cage elements and the connecting element with the protrusions are formed symmetrically in the longitudinal direction and transverse direction. An erroneous installation of the bearing cage during installation of the seat rail pair can therefore be avoided. Error avoidance in accordance with what is referred to as the poka-yoke principle is therefore possible.

The seat rail pair according to the invention for a vehicle seat, in particular a motor vehicle seat, comprises a lower rail and an upper rail which is guided displaceably in the rail longitudinal direction relative to the lower rail, wherein the lower rail and the upper rail mutually engage behind each other with their profiles. Furthermore, the seat rail pair comprises at least one bearing cage according to the invention, which is arranged between the lower rail and the upper rail, or a refinement of said bearing cage with a plurality of accommodated rolling elements which are arranged in a region of interaction between the lower rail and the upper rail, wherein the connecting element is tensioned in the mounted state of the bearing cage.

On account of the rolling elements being arranged in the bearing cage, a fixed positioning of the rolling elements, which are in the form, for example, of rollers or balls, with respect to one another is ensured. On account of the arrangement of the bearing cage with the tensioned connecting element and the resulting spring action, the bearing cage is reliably defined in the mounted state in its fitted position.

When the bearing cage is formed with the protrusions and the resulting avoiding of inadvertent contact, that is to say therefore engagement and interlocking of the cage elements in material recesses and/or depressions of the rail, which is displaceable relative to the bearing cage, a reliable and low-wearing relative displacement of the rails with respect to one another is made possible. Blocking is also avoided. The material recesses and/or depressions introduced into the rail, which is displaceable relative to the bearing cage, permit, for example, engagement of a locking device in the rail and a reduction in material, weight and costs, and provision of end stops in an advantageous position.

In one possible refinement of the seat rail pair, the bearing cage with the rolling elements is arranged between an inner side of the lower rail and an outer side of the upper rail, which is guided within the lower rail.

In a further possible refinement of the seat rail pair, bent contact surface regions for the rolling elements are formed on the inner side of the lower rail, and bent and/or flat contact surface regions for the rolling elements are formed on the outer side of the upper rail, wherein in each case one contact surface region of the lower rail lies opposite in each case one contact surface region of the upper rail. The contact surface regions here permit optimized guiding of the rolling elements on the lower rail and the upper rail.

According to one possible development of the seat rail pair, the bearing cage with the rolling elements is arranged between the inner side of the lower rail and the outer side of the upper rail, which is guided within the lower rail, in such a manner that a flat portion of the inner side of the lower rail, said flat portion being formed between the bent contact surfaces of the lower rail, runs parallel to the flat sides of the connecting element of the bearing cage, and a bent portion of the upper rail, which is formed between two contact surface regions thereof, faces the flat sides and the protrusions and lies at least against the protrusions. This arrangement makes it possible for the bent portion of the outer side of the upper rail, according to a further refinement, to exert the force on the protrusions, which force counteracts a spring force of the connecting element, which is in the form of a spring, and generates the two mutually directed, resulting forces on the cage elements.

A development of the seat rail pair makes provision for the protrusions on the flat sides to be directed in the direction of a spring force produced by the connecting element which is tensioned in the mounted state. An introduction of force opposed to the spring force is therefore optimized by means of one of the two rails of the rail pair.

In one possible refinement of the seat rail pair, the lower rail and the upper rail each substantially have a U-shaped profile, wherein leg ends of the lower rail and upper rail are repeatedly bent and engage behind one another in such a manner that two lateral, inner regions of interaction are formed between the lower rail and the upper rail, wherein a respective bearing cage with a plurality of accommodated rolling elements is arranged in each region of interaction. The engagement behind or interlocking of the upper rail and the lower rail is configured here, for example, in such a manner that, with respect to a rail transverse direction, in the regions of interaction, the end portions of the upper rail are inclined obliquely and the end portions of the lower rail run vertically and horizontally. By this means, the seat rail pair has an improved crash performance, in particular a high peel strength, and improved stability, in particular lateral support for the locking, and vertical stability, in particular vertical support of the upper rail on the lower rail.

The vehicle seat according to the invention comprises at least one seat rail pair according to the invention or refinements of same. A vehicle seat equipped with two seat rail pairs according to the invention is preferably used in a motor vehicle, specifically as a rule as a front seat. The seat rail pair serving as a longitudinal adjuster is preferably fitted in such a manner that the lower rail forms the guide rail mounted on the vehicle structure and the upper rail forms the sliding rail mounted on the seat structure. However, the functions of the two seat rails can also be precisely reversed. Owing to the configuration of the seat rail pairs with the bearing cages and rolling elements, reliable longitudinal adjustment of the vehicle seat can be realized with little effort and little wear.

Exemplary embodiments of the invention are explained in more detail with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
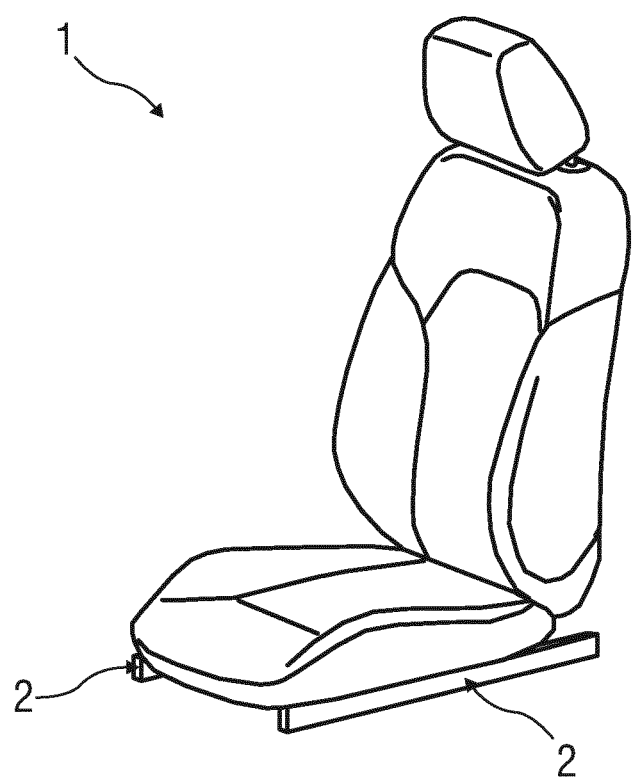
FIG. 1 is a schematic perspective view of a vehicle seat.

Referring to the drawings, mutually corresponding parts are provided with the same reference signs in all of the figures.

In FIG. 1, a vehicle seat 1, in particular a front seat for a motor vehicle, is illustrated in a perspective view. Said vehicle seat is equipped with two seat rail pairs 2 for the longitudinal adjustment. The seat rail pairs 2 are fitted to the vehicle seat in such a manner that a lower rail 3, illustrated in more detail in FIG. 2, in each case forms a guide rail mounted on the vehicle structure, and an upper rail 4, likewise illustrated in more detail in FIG. 2, in each case forms the sliding rail mounted on the seat structure. However, the functions of the lower rail 3 and upper rail 4 can also be precisely reversed.

The two seat rail pairs 2 are constructed substantially identically. Only one seat rail pair 2 is therefore described in more detail below.

Figure 2:
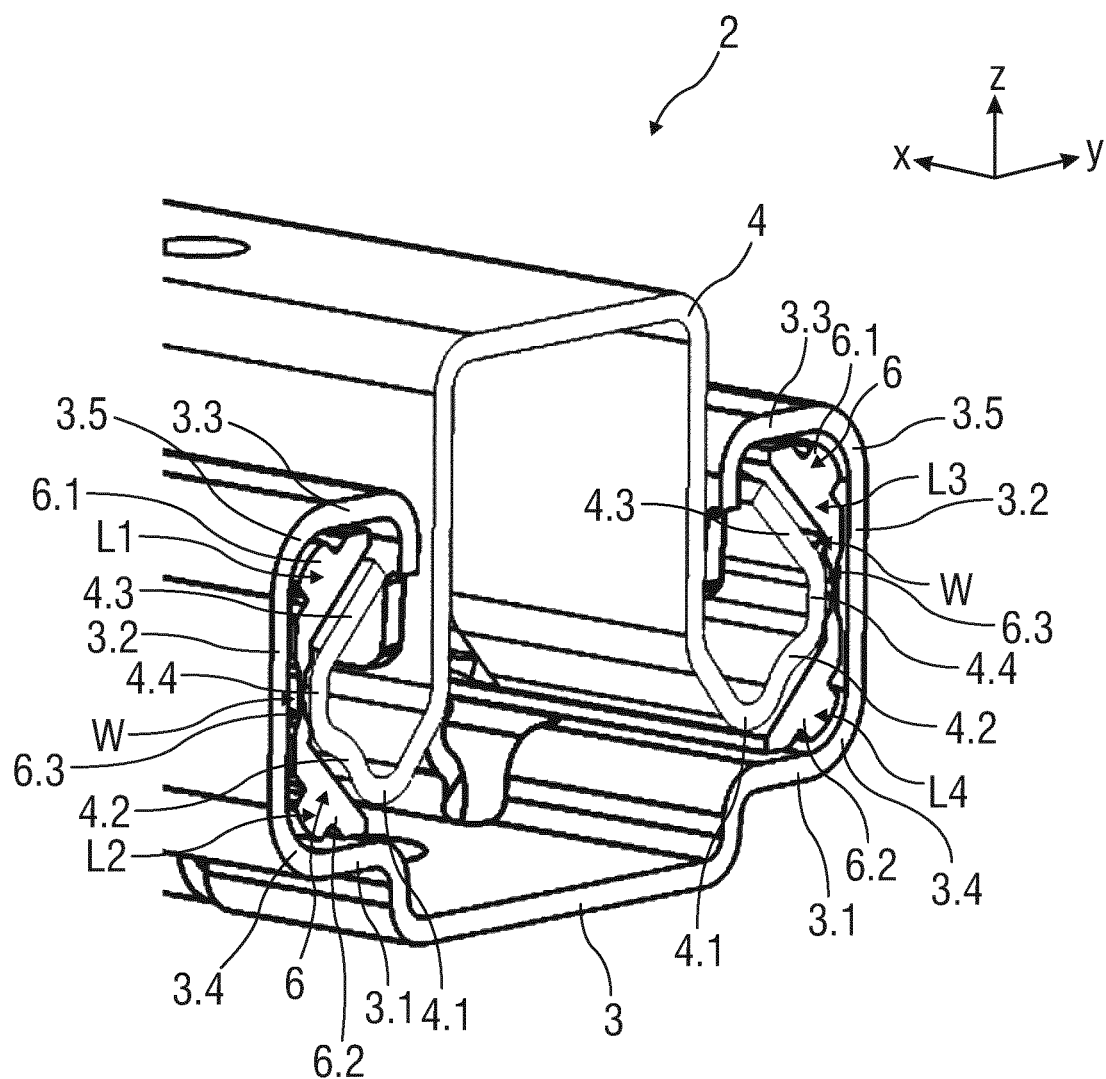
FIG. 2 is a schematic sectional perspective view of a seat rail pair.
Figure 3:
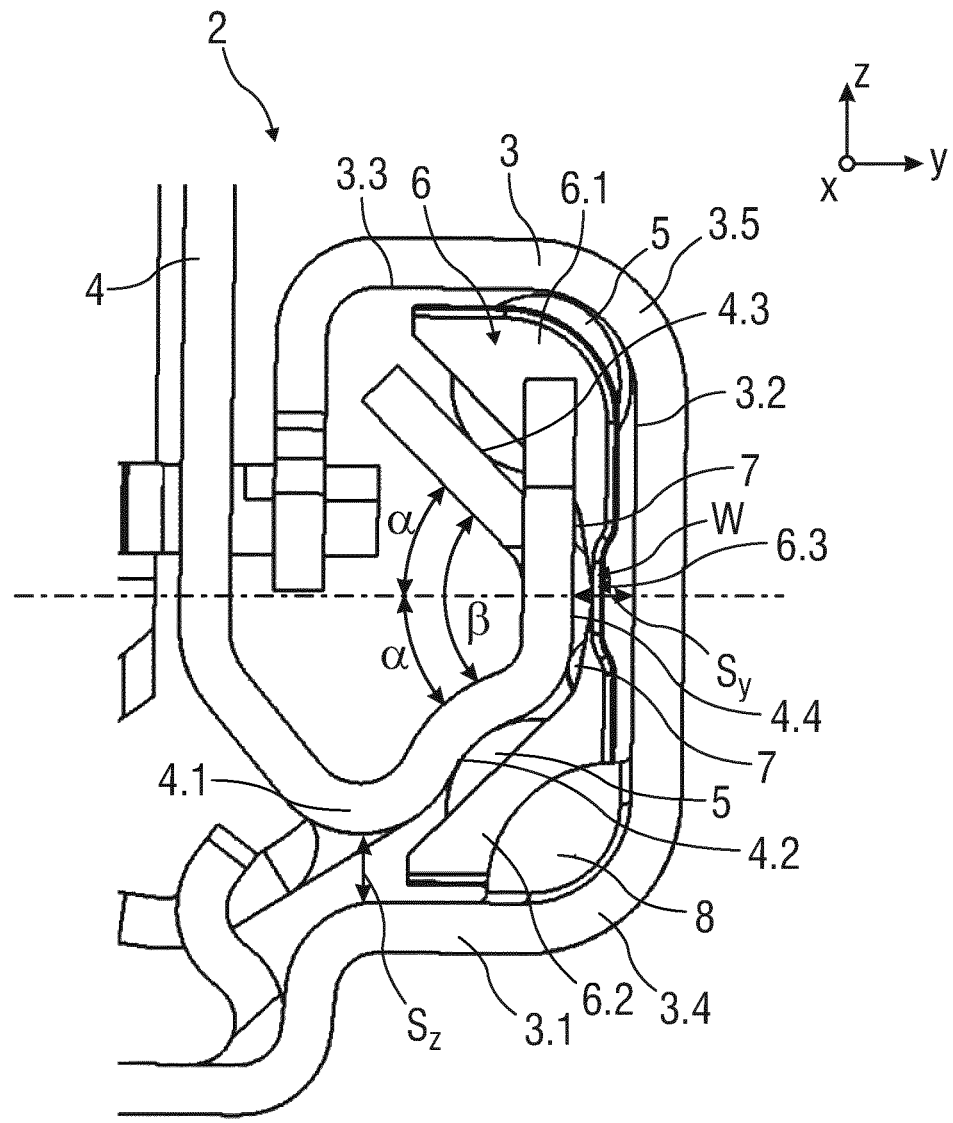
FIG. 3 is a schematic end side view of the seat rail pair.

FIGS. 2 and 3 show details of the seat rail pair 2 in different views.

The seat rail pair 2 comprises the lower rail 3 and the upper rail 4, which is guided displaceably in the rail longitudinal direction X relative to the lower rail 3, said rails engaging mutually behind each other with their profiles.

The lower rail 3 and the upper rail 4 here in each case substantially have a U-shaped profile, the leg ends of which are repeatedly bent and engage behind one another in such a manner that two lateral, inner regions of interaction W are formed between the lower rail 3 and the upper rail 4.

The engagement behind or interlocking of the upper rail 4 and the lower rail 3 is configured in such a manner that, with respect to a rail transverse direction Y, in the regions of interaction W, end portions of the upper rail 4 are inclined obliquely and end portions of the lower rail 3 run vertically and horizontally.

By this means, the seat rail pair 2 has an improved crash performance (high peel strength) and improved stability, in particular a lateral support for locking the upper rail 4 relative to the lower rail 3, and vertical stability, in particular vertical support of the upper rail 4 on the lower rail 3.

Furthermore, the lower rail 3 and the upper rail 4 are formed with at least one predetermined gap size $S_z$ and/or $S_y$ being maintained between them. In particular, the end portions of the profiles of the lower rail 3 and of the upper rail 4 are deformed in such a manner that, in the respective region of interaction W, defined gap sizes $S_z$, $S_y$ are maintained between said rails, with respect to an overall height or the overall width of the seat rail pair 2.

Furthermore, the end portions of the lower rail 3 and of the upper rail 4 are bent over in such a manner that, in the event of a load in the rail vertical direction Z, i.e. in the vertical direction, the upper rail 4 can be supported with a bent portion 4.1, in particular with an acutely bent and downwardly bent end portion, on a flat horizontal portion 3.1 of the lower rail 3, said flat horizontal portion lying opposite the bent portion 4.1. This improves stability of the upper rail in the event of a load.

Rolling elements 5, in particular balls, for the longitudinal adjustment of the upper rail 4 relative to the lower rail 3 are arranged in the regions of interaction W between the lower rail 3 and the upper rail 4. The rolling elements 5 are arranged in a bearing cage 6 which is fastened to the upper rail 4 and is displaceable therewith relative to the lower rail 3.

In order to form raceways L1 to L4 for the rolling elements 5, bent contact surface regions 3.4, 3.5 for the rolling elements 5 are formed on the inner side of the lower rail 3 between the flat portion 3.1 and a further flat portion 3.2, which is arranged perpendicularly thereto, and between said portion 3.2 and a further flat portion 3.3, which lies opposite and parallel to the portion 3.1. Furthermore, in order to form the raceways L1 to L4, a bent contact surface region 4.2 and a flat contact surface region 4.3 for the rolling elements 5 is formed on the outer side of the upper rail 4, wherein in each case one contact surface region 4.2, 4.3 of the upper rail 4 lies opposite in each case one contact surface region 3.4, 3.5 of the lower rail 3.

A common bearing cage 6 for the rolling elements 5 is provided here per upper raceway L1 and L3 and lower raceway L2 and L4. The rolling elements 5 arranged in the respective bearing cage 6 have an identical diameter. The rolling elements 5 of all of the raceways L1 to L4 can have an identical diameter here. Alternatively, the diameter of the rolling elements 5 for the upper raceways L1, L3 can differ from the diameter of the rolling elements 5 for the lower raceways L2, L4. The rolling elements 5 of the lower raceways L2, L4 have, for example, a larger diameter here.

The different diameters of the rolling elements 5 of the upper raceways L1, L3 with respect to the lower raceways L2, L4 permit compensation of manufacturing tolerances and control of possible displacement forces as a result of mechanical stressing of the seat rail pair 2.

The lower rail 3 and the upper rail 4 are bent over in such a manner that flat contact surface regions 4.3 and bent contact surface regions 3.4, 3.5, 4.2 for the rolling elements 5 are formed in the raceways L1 to L4 formed between said rails.

Depending on the profile, the seat rail pair 2 here has an identical number of deformations. In particular, the profiles for lower rail 3 and upper rail 4 in each case have ten deformations which are coordinated with one another in such a manner that the lower rail 3 and the upper rail 4 are formed symmetrically in the Z-X plane and/or in the Z-Y plane. The lower rail 3 is repeatedly bent here, with a respective maximum bending angle being 90°.

The end portions of the upper rail 4 are thus deformed and bent for the raceways L1 to L4 in the two opposite regions of interaction W with a pitch angle α within a range of 40° to 50°, in particular of 45°, and, in said obliquely inclined end portions, form contact surface regions 4.2, 4.3 for the rolling elements 5 of the raceways L1 to L4.

End portions, which are bent by 90°, of the lower rail 3 lie opposite the end portions, which are inclined obliquely, in particular obliquely by 45° with respect to the Y plane, of the upper rail 4.

For the upper raceways L1, L3, the opposite bent end portions of the lower rail 3 have a radius which approximately corresponds to the radius of the relevant raceway L1 or L3. The end portions of the upper rail 4 are simply shaped and inclined obliquely with a pitch angle α of approx. 45° with respect to the Y axis (=rail transverse direction Y).

For the lower raceways L2 and L4, the bent end portions of the upper rail 4 and of the lower rail 3 have a radius which approximately corresponds to the radius of the relevant raceways L2 and L4. The bent end portions of the upper rail 4 are inclined obliquely here with a pitch angle α of approx. 45° with respect to the Y axis.

Such a configuration of the upper and lower raceways L1 to L4 makes it possible that, in the event of a load, with a direction of the introduction of force, which is predetermined by the radius and is simultaneously changed, in the contact of the upper rail 4 with the rolling elements 5, a contact point in said raceways L1 to L4 migrates outward in such a manner that a force vector is approximate to the vertical. By this means, upon a load, the stability of the seat rail pair 2 in the vertical direction Z of the rail is improved.

As already explained above, the diameters of the rolling elements 5 of the upper raceways L1, L3 and the diameters of the rolling elements 5 of the lower raceways L2, L4 can be different. The variation of the diameters of the rolling elements 5 serves for correcting the position of the upper rail 4 and for adjusting the gap sizes $S_z$, $S_y$ and therefore the distance between the profiles of the upper rail 4 and lower rail 3.

The described inclination of the end portions of the upper rail 4 leads to a primarily horizontal compensation for tolerances by springing together in the rail transverse direction Y of the profile of the upper rail 4 in comparison to a vertical compensation for tolerances in the case of conventional rail pairs.

The end portions of the lower rail 3 and of the upper rail 4 are furthermore bent over in such a manner that two raceways L1, L3 and L2, L4 are formed per rail side. The raceways L1 and L2 constitute the upper raceways, and the raceways L2 and L4 constitute the lower raceways with respect to the rail vertical direction Z. The end portions, which are inclined obliquely with the pitch angle α, of each rail side of the upper rail 4 are arranged at an angle β of 80° to 100°, in particular at an angle β of 90°, with respect to each other.

In other words: the end portions, which are inclined obliquely with the pitch angle α, of each rail side of the upper rail 4 are configured in such a manner that they form the legs of an isosceles triangle.

The end portions, formed on the opposite rail sides, of lower rail 3 and upper rail 4, with the contact surface regions 3.4, 3.5, 4.2, 4.3 in the raceways L1 to L4, are formed in a mirrored manner with respect to each other in the rail vertical direction Z with respect to the Z axis forming an axis of symmetry.

In other words: the lower rail 3 and the upper rail 4 are formed symmetrically with respect to at least one plane of the seat rail pair 2, said plane being defined by the rail longitudinal direction X and the rail vertical direction Z, i.e. the vertical, and/or by the rail transverse direction Y and the rail vertical direction Z.

Figure 4:
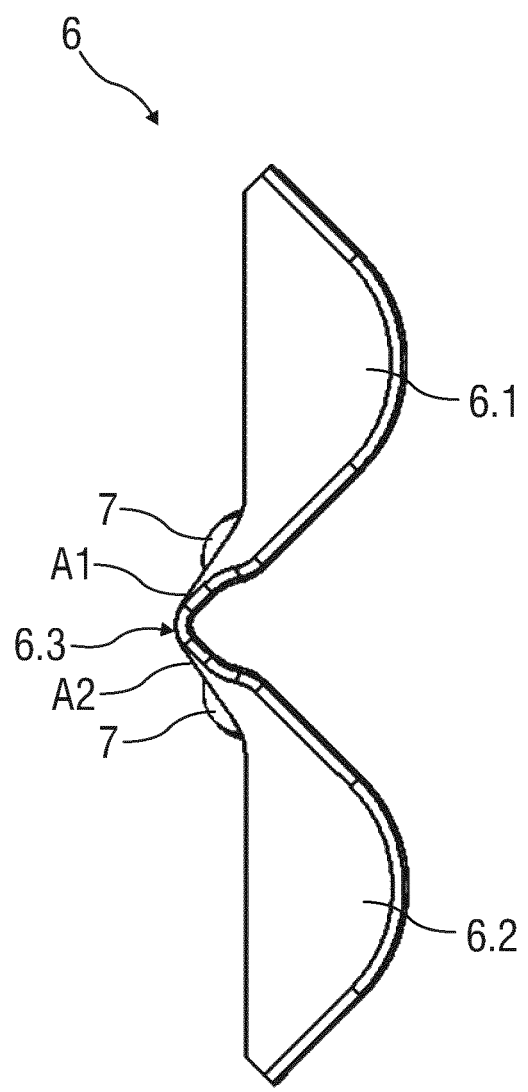
FIG. 4 is a schematic end side view of a bearing cage in a first position.
Figure 6:
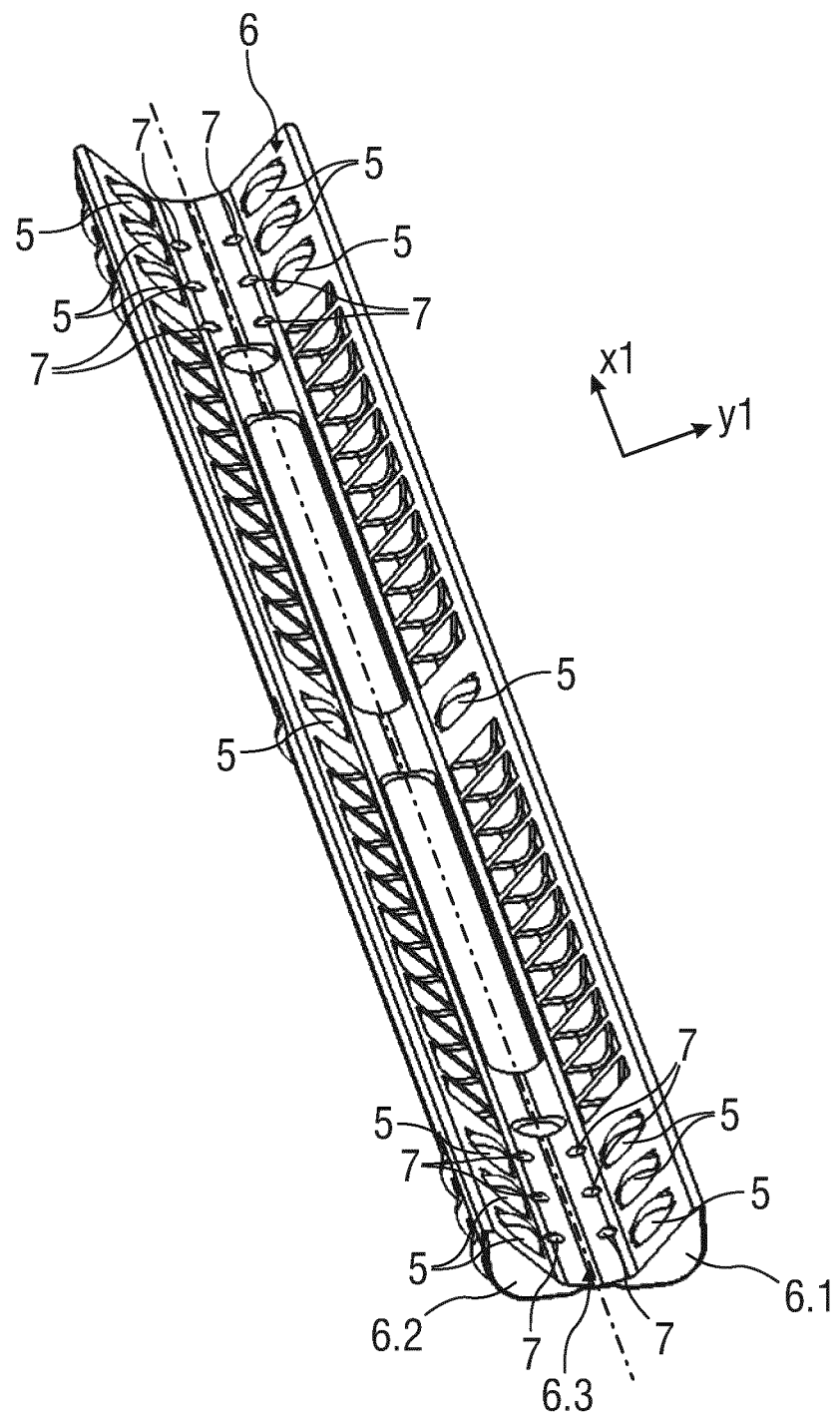
FIG. 6 is a schematic perspective view of the bearing cage according to FIG. 4 with a plurality of rolling elements in a second position.

The bearing cage 6 which is provided for receiving the rolling elements 5 has two cage elements 6.1, 6.2 which are of axially symmetrical configuration and are connected by means of a connecting element 6.3 which is arranged between the cage elements 6.1, 6.2, on facing longitudinal sides thereof, and runs parallel to the axis of symmetry S, which is illustrated in more detail in FIG. 6. In the mounted state of the seat rail pair 2, are facing the upper rail 4 on flat sides A1, A2 of the connecting element 6.3, said flat sides running parallel to the axis of symmetry S and being illustrated in more detail in FIG. 4, and each have protrusions 7 which are directed in the direction of the upper rail 4.

The bearing cage 6 with the rolling elements 5 is arranged here between the inner side of the lower rail 3 and the outer side of the upper rail 4, which is guided within the lower rail 3, in such a manner that the flat portion 3.2 of the inner side of the lower rail 3, which flat portion is formed between the bent contact surface regions 3.4, 3.5 of the lower rail 3, runs parallel to the flat sides A1, A2 of the connecting element 6.3 of the bearing cage 6. A bent portion 4.4 of same, which is formed between the two contact surface regions 4.2, 4.3 of the upper rail 4, faces the flat sides A1, A2 and protrusions 7 of the connecting element 6.3 and lies at least against the protrusions 7.

Figure 5:
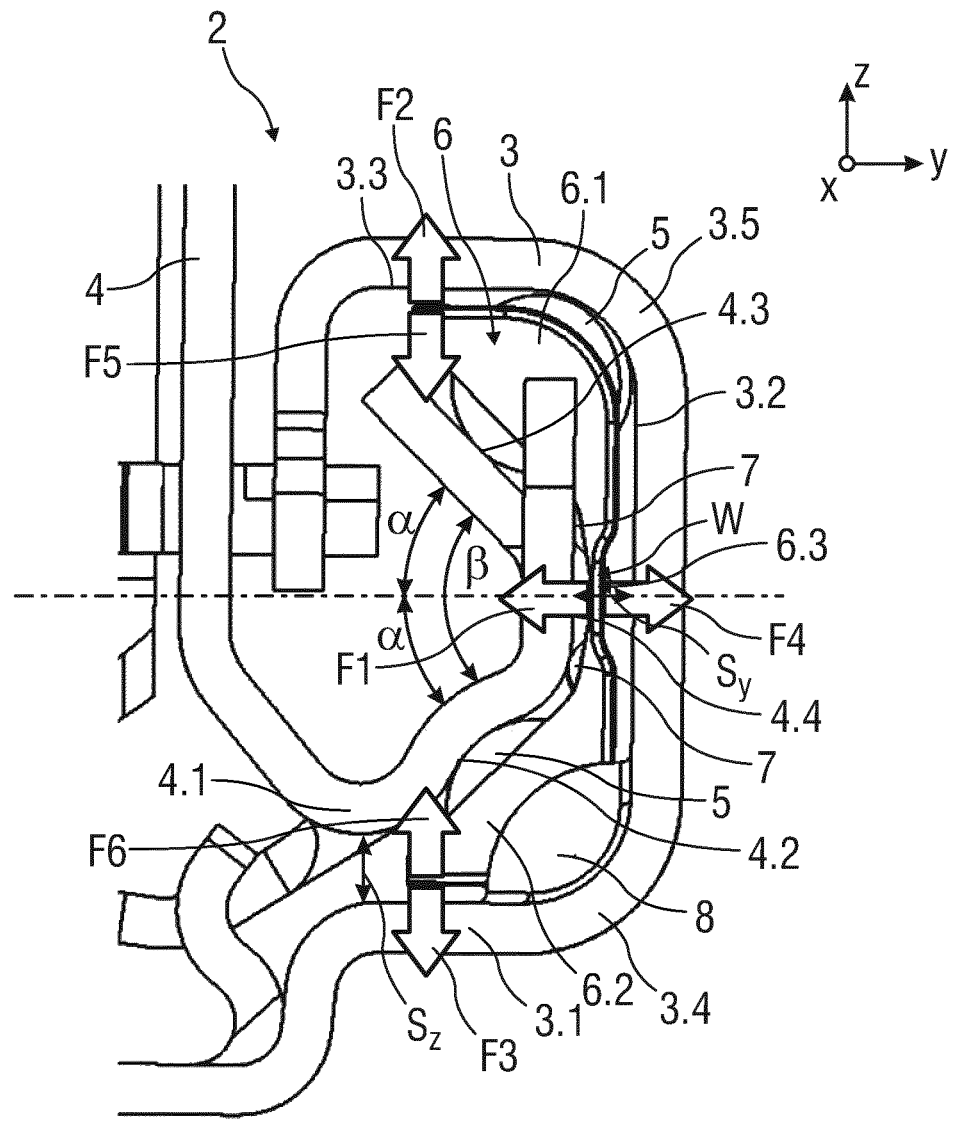
FIG. 5 is a schematic end side view of the seat rail pair according to FIG. 3 showing acting forces.

Furthermore, an end stop 8 arranged in the lower rail 3 is shown in FIGS. 3 and 5. The end stop 8 is deployed inward, for example, from the material of the lower rail 3. The end stop 8 is formed in particular in a manner corresponding to the shape of the abutting end side of the bearing cage 6 and shaped in a corresponding manner.

The connecting element 6.3 is of mechanically flexible configuration and is deformable about the axis of symmetry S substantially in the manner of a hinge. The connecting element 6.3 here is configured in such a manner that the latter deforms in accordance with the illustration in FIG. 4 and therefore, in the non-installed or non-fixed state, moves the cage elements 6.1, 6.2 toward each other by their outer rear sides. By this means, fixing of the bearing cage 6 within the lower rail 3 before the installation of the upper rail 4 is achieved.

Owing to this automatic deformation (illustrated in FIG. 4) of the connecting element 6.3 because of the endeavor to return like a spring into a ready-from-the-mold or relaxed state, the bearing cage 6 in the mounted state generates a spring force F1 and, from the latter, resulting forces F2, F3 on the lower rail 3 and the upper rail 4.

This is illustrated in more detail in FIG. 5 by way of the example of the detail of the end side of the seat rail pair 2 according to FIG. 3.

Owing to the automatic deformation of the bearing cage 6, the spring force F1 and the forces F2, F3 are generated, wherein, because of the forces F2 and F3, end portions of the cage elements 6.1, 6.2 are pressed in the direction of the flat portions 3.1, 3.3 of the lower rail 3.

The lower rail 3 has material recesses and/or depressions which are provided in a manner not illustrated specifically, for example for reducing weight and/or for engagement of a locking device in the lower rail 3. In order, during a relative displacement of the upper rail 4 with respect to the lower rail 3, to avoid an engagement and interlocking, caused by the forces F2 and F3, of the end portions of the cage elements 6.1, 6.2 in the material recesses and/or depressions, the bearing cage 6 with the rolling elements 5 is arranged between the inner side of the lower rail 3 and the outer side of the upper rail 4, which is guided within the lower rail 3, in such a manner that the bent portion 4.4 of the outer side of the upper rail 4 exerts a force F4 on the protrusions 7. Owing to said force F4, forces F5, F6 are generated which result at the end portions of the cage elements 6.1, 6.2 and oppose the forces F2, F3, and therefore the end portions of the cage elements 6.1, 6.2 are pressed away from the respective flat portion 3.1, 3.3 of the lower rail 3.

Figure 7:
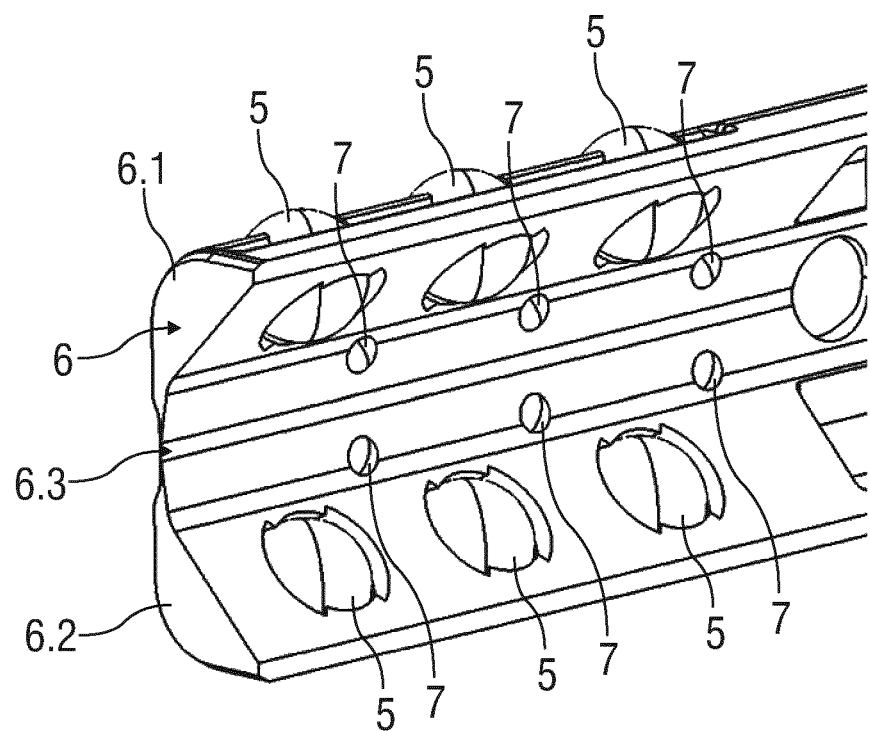
FIG. 7 is a schematic perspective enlarged detail view of the bearing cage according to FIG. 6.
Figure 8:
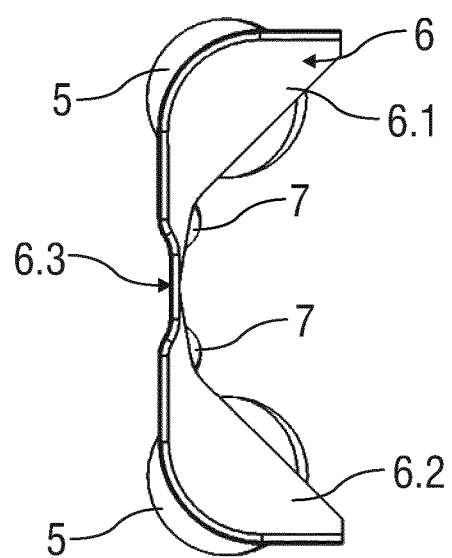
FIG. 8 is a schematic end side view of the bearing cage according to FIG. 6.

FIGS. 6 to 8 show, in various views, the bearing cage 6 or a detail thereof with a plurality of rolling elements 5 in a second position, i.e. a position which said bearing cage has in particular in the mounted state of the seat rail pair 2.

The bearing cage 6 comprises a plurality of protrusions 7 which are each configured as a spherical segment. A plurality of protrusions 7 are spaced apart here in a front end region and a rear end region of the bearing cage 6 and are arranged parallel on each flat side A1, A2 of the connecting element 6.3. In the exemplary embodiment illustrated, the bearing cage 6 comprises two groups of protrusions 7, wherein in each case one group is arranged in the front end region and one group in the rear end region of the bearing cage 6. Each group comprises six protrusions 7, wherein in each case three protrusions 7 on the flat side A1 are arranged lying opposite three protrusions 7 on the flat side A2.

In the illustrated exemplary embodiment of the bearing cage 6, the cage elements 6.1, 6.2 and the connecting element 6.3 are formed symmetrically with the protrusions 7 in the longitudinal direction X1 and transverse direction Y1 such that an erroneous installation of the bearing cage 6 with the rolling elements 5 within the seat rail pair 2 can be effectively avoided.

That is to say, on each side of the bearing cage 6, the same number of rolling elements 5 and the same number of protrusions 7 are provided at symmetrical positions on the bearing cage 6.

In exemplary embodiments which are not illustrated specifically, a differing arrangement and/or number of protrusions 7 is also possible.

While specific embodiments of the invention have been shown and described in detail to illustrate the application of the principles of the invention, it will be understood that the invention may be embodied otherwise without departing from such principles.

The invention claimed is:

1. A bearing cage for a seat rail pair of a vehicle seat, the bearing cage comprising:
   two interconnected cage elements of axially symmetrical design for receiving a number of rolling elements; and
   a connecting element which is arranged between the cage elements on facing longitudinal sides thereof, runs parallel to an axis of symmetry and comprises a mechanically flexible configuration,
   wherein the connecting element comprises a spring, and the cage elements form spring legs which are pivotable about the axis of symmetry.

2. The bearing cage as claimed in claim 1, wherein the connecting element has protrusions that are in each case formed on flat sides of one side of the connecting element, said flat sides running parallel to the axis of symmetry.

3. The bearing cage as claimed in claim 2, wherein the protrusions are each in the form of a spherical segment.

4. The bearing cage as claimed in claim 2, wherein the cage elements and the connecting element with the protrusions are formed symmetrically in a longitudinal direction and in a transverse direction.

5. A seat rail pair for a vehicle seat, in particular a motor vehicle seat, the seat rail pair comprising:
   a lower rail;
   an upper rail which is guided displaceably in a rail longitudinal direction relative to the lower rail, wherein the lower rail and the upper rail each have profiles that mutually engage behind each other; and
   at least one bearing cage, which is arranged between the lower rail and the upper rail, the at least one bearing cage comprising:
   two interconnected cage elements of axially symmetrical design for receiving a number of rolling elements;
   a connecting element arranged between the cage elements on facing longitudinal sides thereof and running parallel to an axis of symmetry, the connecting element comprising a mechanically flexible spring configuration, wherein the cage elements form spring legs which are pivotable about the axis of symmetry; and
   a plurality of accommodated rolling elements which are arranged in a region of interaction between the lower rail and the upper rail, wherein the connecting element is tensioned in a mounted state of the bearing cage.

6. The seat rail pair as claimed in claim 5, wherein the protrusions on the flat sides are directed in a direction of a spring force generated by the connecting element, which is tensioned in the mounted state.

7. The seat rail pair as claimed in claim 6, wherein the bearing cage with the rolling elements is arranged between an inner side of the lower rail and an outer side of the upper rail, which is guided within the lower rail.

8. The seat rail pair as claimed in claim 7, wherein bent contact surface regions for the rolling elements are formed on the inner side of the lower rail, and contact surface regions for the rolling elements are formed on the outer side of the upper rail, wherein in each case one contact surface region of the lower rail lies opposite in each case one contact surface region of the upper rail.

9. The seat rail pair as claimed in claim 8, wherein the bearing cage with the rolling elements is arranged between the inner side of the lower rail and the outer side of the upper rail, which is guided within the lower rail, such that a flat portion of the inner side of the lower rail, said flat portion being formed between the bent contact surface regions of the lower rail, runs parallel to the flat sides of the connecting element of the bearing cage, and a bent portion of the upper rail, which is formed between two contact surface regions thereof, faces the flat sides and the protrusions and lies at least against the protrusions.

10. The seat rail pair as claimed in claim 9, wherein the bearing cage with the rolling elements is arranged between the inner side of the lower rail and the outer side of the upper rail, which is guided within the lower rail, such that the bent portion of the outer side of the upper rail exerts a force on the protrusions, wherein the force counteracts a spring force of the connecting element, which is in the form of a spring.

11. The seat rail pair as claimed in claim 5, wherein:
    the lower rail and the upper rail each substantially have a U-shaped profile;
    leg ends of the lower rail and upper rail are repeatedly bent and engage behind one another such that two lateral, inner regions of interaction are formed between the lower rail and the upper rail; and
    a respective bearing cage with a plurality of accommodated rolling elements is arranged in each region of interaction.

12. A vehicle seat comprising at least one seat rail pair comprising:
    a lower rail;
    an upper rail which is guided displaceably in a rail longitudinal direction relative to the lower rail, wherein the lower rail and the upper rail each have profiles that mutually engage behind each other; and
    at least one bearing cage, which is arranged between the lower rail and the upper rail, the at least one bearing cage comprising:
    two interconnected cage elements of axially symmetrical design for receiving a number of rolling elements;
    a connecting element arranged between the cage elements on facing longitudinal sides thereof and running parallel to an axis of symmetry, the connecting element comprising a mechanically flexible spring configuration, wherein the cage elements form spring legs which are pivotable about the axis of symmetry; and
    a plurality of accommodated rolling elements which are arranged in a region of interaction between the lower rail and the upper rail, wherein the connecting element is tensioned in a mounted state of the bearing cage.

13. The vehicle seat as claimed in claim 12, wherein protrusions on the flat sides are directed in a direction of a spring force generated by the connecting element, which is tensioned in the mounted state.

14. A vehicle seat as claimed in claim 13, wherein the bearing cage with the rolling elements is arranged between an inner side of the lower rail and an outer side of the upper rail, which is guided within the lower rail.

15. A vehicle seat as claimed in claim 14, wherein bent contact surface regions for the rolling elements are formed on the inner side of the lower rail, and contact surface regions for the rolling elements are formed on the outer side of the upper rail, wherein in each case one contact surface region of the lower rail lies opposite in each case one contact surface region of the upper rail.

16. A vehicle seat as claimed in claim 15, wherein the bearing cage with the rolling elements is arranged between the inner side of the lower rail and the outer side of the upper rail, which is guided within the lower rail, such that a flat portion of the inner side of the lower rail, said flat portion being formed between the bent contact surface regions of the lower rail, runs parallel to the flat sides of the connecting element of the bearing cage, and a bent portion of the upper rail, which is formed between two contact surface regions thereof, faces the flat sides and the protrusions and lies at least against the protrusions.

17. A vehicle seat as claimed in claim 16, wherein the bearing cage with the rolling elements is arranged between the inner side of the lower rail and the outer side of the upper rail, which is guided within the lower rail, such that the bent portion of the outer side of the upper rail exerts a force on the protrusions, wherein the force counteracts the spring force of the connecting element, which is in the form of a spring.

18. A vehicle seat as claimed in claim 12, wherein:
the lower rail and the upper rail each substantially have a U-shaped profile;
leg ends of the lower rail and upper rail are repeatedly bent and engage behind one another such that two lateral, inner regions of interaction are formed between the lower rail and the upper rail; and
a respective bearing cage with a plurality of accommodated rolling elements is arranged in each region of interaction.

* * * * *